United States Patent Office 3,553,204
Patented Jan. 5, 1971

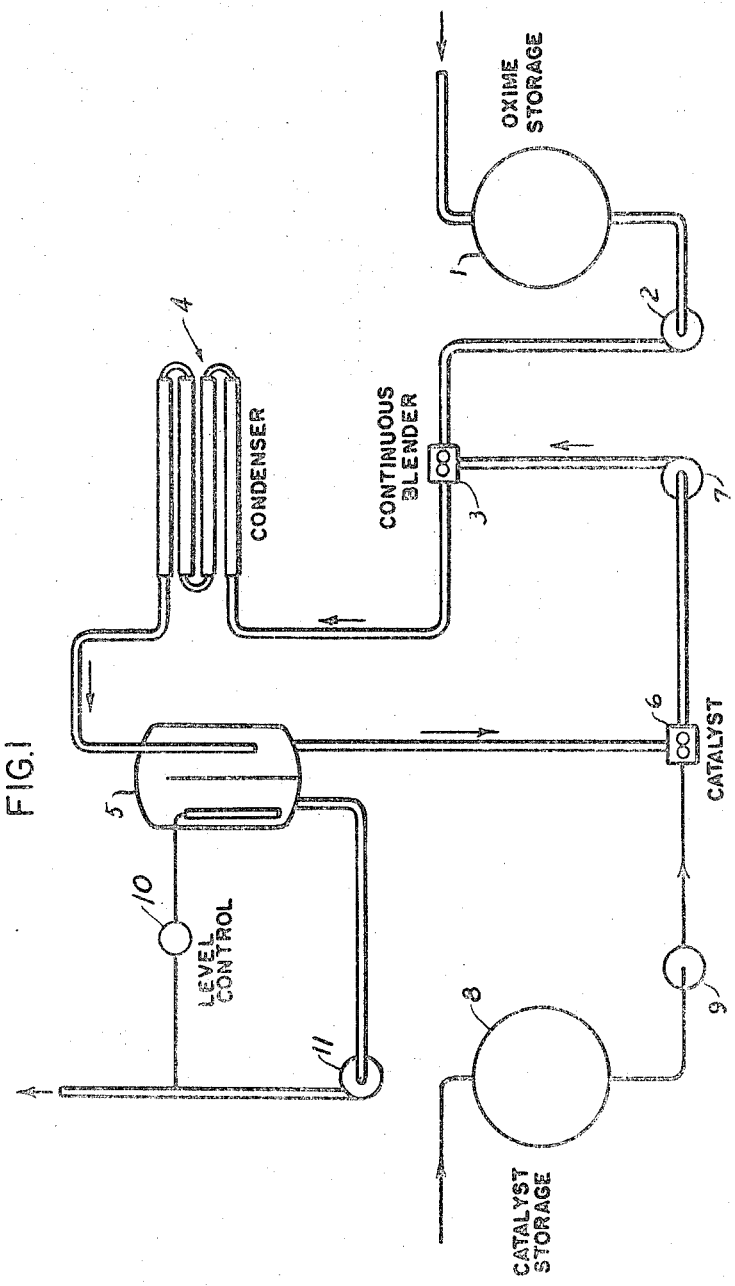

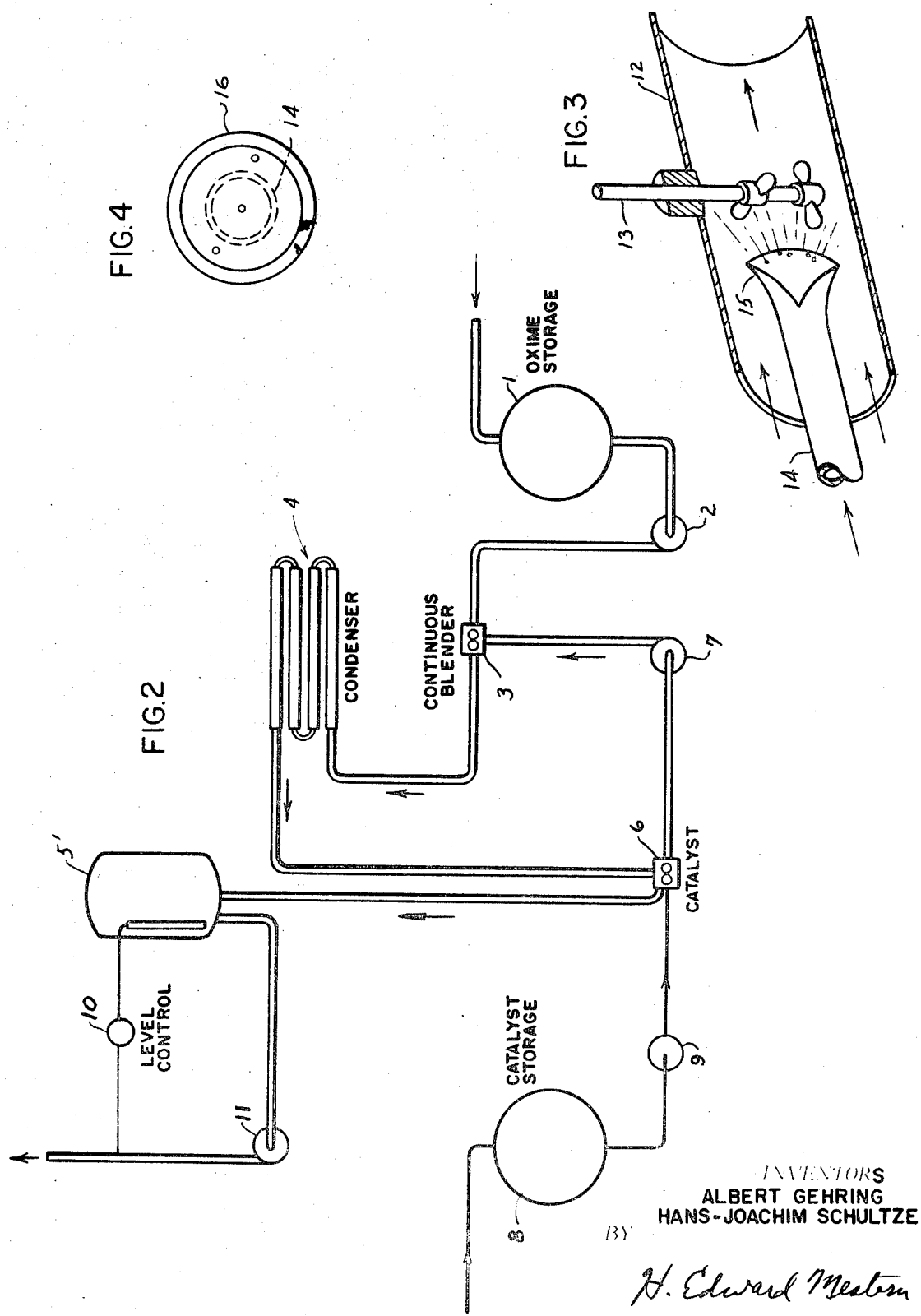

---

3,553,204
PROCESS FOR THE CONTINUOUS MANUFACTURE OF LACTAMS
Albert Gehring, Tamins, Guiseppe Bertrossa, Domat-Ems, and Hans-Joachim Schultze, Chur, Switzerland, assignors to Inventa A.G. fur Forschung und Patentverwertung, Zurich, Switzerland
Filed Jan. 10, 1967, Ser. No. 613,383
Claims priority, application Switzerland, Jan. 14, 1966, 526/66
Int. Cl. C07d 41/06
U.S. Cl. 260—239.3     10 Claims

---

A process for the continuous production of lactams which are starting materials for nylon-type polyamides, from cyclic ketoximes, using mineral acids as a catalyst, cycling oxime and acid by way of nozzles from continuous mixers in lieu of using agitator vessels. The nozzle delivery speed of the oxime and of the acid is at least twice the flow velocity of the cycle and the volume proportions of the product pumped per hour to oxime introduced is 50:1 to 150:1.

---

The Beckmann rearrangement of cyclic ketoximes, especially of cyclohexanone oxime and its higher homologs, carried out in the presence of such catalysts as, e.g., sulfuric acid, oleum, or other acids, e.g., phosphoric acid, in liquid phase, yields the corresponding lactams. The latter are the starting materials for nylon-type polyamides.

It is known that undesirable by-products readily are obtained in the Beckmann rearrangement of, e.g., cyclohexanone oxime (but also of their higher homologs) due to the violence of the reaction upon mixing the oximes with the acid catalyst. These side reactions are the result of local overheating. They are aggravated by the reaction of the water dissolved in the oximes which occurs simultaneously, especially when sulfuric acid is used, because the free sulfur trioxide therein converts to sulfuric acid with said water. The by-products formed by local overheating and the resultant partial decomposition of the oxime can be separated from the lactam formed only with great difficulty and frequently incompletely thus adversely influencing the quality of the lactam. Not only caprolactam, formed from cyclohexanone oxime, but also the higher homologs, upon polymerization to nylon-type polyamides, thus yield end products which are unusable for great many purposes.

In order to avoid local overheating during the rearrangement, a contact time of as short as possible a duration of the pure components is required, i.e., most rapid homogenization of the oxime with the acid catalyst, or with the reaction mixture, respectively.

It had previously been proposed to carry out the rearrangement in an agitator provided with internal and external cooling means and to introduce the oxime and acid separately, as in U.S. 2,487,246. These measures, however, avoid the drawbacks described above only to a slight extent because the effectiveness of an agitator is insufficient in large reactors containing viscous products and particularly is inadequate for Beckmann type rearrangements. Moreover, the oxime is greatly diluted, as is the acid. It therefore had further been suggested, in French Pat. 1,346,573, to measure the oxime into the reactor by means of a nozzle from which the oxime enters the reaction mixture at high speed. However, this variation also cannot avoid the drawbacks named because the homogenization of the mixtures in the reactor occurs too slowly, increasingly so with higher homologs, due to the higher viscosities prevailing in the reactor.

Dutch Pat. 78,624, therefore proposes to carry out the reaction in a cycling system without an agitator, using in lieu thereof a "turbulence chamber." In the latter, a strong cyclone flow prevails which effects better and faster mixing of the reaction product from the cycle with the oxime entering the chamber. The acid catalyst is added behind the chamber, the reacted product is drawn off from a reactor surrounding the chamber.

The heat dissipation is accomplished by means of a condenser installed behind the rotary pump.

This process and device has two fundamental flaws. The draw-off of the reaction product from a vessel surrounding the turbulence chamber carries with it the danger that unreacted oxime is drawn off which later on is present in the lactam and, consequently, in the polymer. Secondly, an immediate homogenization of the acid catalyst with the oxime-containing reaction product is not assured because the mixing of two liquid components takes place very slowly in a concurrent stream. Because the instant homogenization of the oxime in the reaction cycling product and, equally so, the homogenization of the acid catalyst, particularly sulfuric acid and/or oleum, is of decisive importance, the suppression of undesirable by-product formation is not averted and the problem is insufficiently solved by the proposed method.

It now has been found that all these drawbacks occurring during the Beckmann rearrangement of the oximes to lactams can be averted by carrying out the process in a cycling system using no agitator vessels but, instead, two continuous mixers, adding the oxime and the acid catalyst at different locations into the cycle through nozzles. This simple method leads to a surprising improvement in the quality of the lactams and simultaneously to a considerable increase in the lactam yield, calculated on the starting oxime. This is particularly true for the rearrangement of cyclododecanone oxime in the presence of cyclododecanone, whereby the yield improves by at least 7% as compared to a process in an agitated reactor.

The continuous mixers are high-speed intensive blenders with an external drive, installed in the circulating system, through which the cycling product flows with the speed prevailing in the cycle. The oxime and the acid catalyst are introduced by way of nozzles having one or more openings of preferably 0.5-2 mm. diameter, directly into the blender or else at a point immediately adjacent thereto. The direction of the flow of the product introduced coincides with that of the cycling product.

In principle, the openings of the nozzles can be disposed at will. Special embodiments of the nozzles are those in the shape of a wedge or a ring, whereby the openings are disposed at the front edge of the entrance pipe. These shapes prevent the formation of stagnant eddy or turbulence zones.

These provisions primarily effect a fine distribution of the substances introduced into a plurality of strings or schlieren, and secondarily, the instant dissolution of these strings in the cycling product. The oxime and acid catalyst, moreover, advantageously are introduced under a pressure which effects an exit speed of 3-15 m./sec., depending upon the amount of openings and their diameters. The actually required exit speed is governed by the speed of the circulation of the reaction product. The exit speed must be a multiple, at least twice that, of the circulation speed. The number of openings of the oxime nozzle and their diameters, in order to attain this exit speed, must be calculated so that the proportion of the circulating quantity to that of oxime added per hour is 50:1 to 150:1, preferably 100:1.

The oxime and acid catalyst are introduced at different locations in the cycle. This has the effect that the reaction components always act upon each other in the maximal attainable dilution so that the formation of local reaction zones and hence the peril of local overheating are averted. The heat evolved by the reaction, i.e., the thermal effect obtained by the rearrangement of the oxime to lactam and the heat evolved due to the formation of sulfuric acid from water and $SO_3$ (in the case of sulfuric acid and/or oleum as catalyst) is distributed to the entire working cycle so that heat dissipation is facilitated. This contrasts from the processes using agitators wherein great temperature differences occur.

Heat transfer instantly is carried out, e.g., by means of a tube condenser installed in the cycle between the oxime- and catalyst blenders.

The Beckmann rearrangement according to the invention is independent of the oxime used. When higher homologs of cyclohexanone oxime are converted, solvent might have to be used because, e.g., cyclododecanone oxime having a melting point of 133–134° C. would have to be heated to a sufficiently high temperature without a solvent which might lead to thermal damage, i.e., decomposition. The process is particularly advantageous for the Beckmann rearrangement of cyclic ketoximes having 5 to 15 carbon atoms.

In the following, the process will be further explained with reference to the accompanying drawings and by a number of Examples. However, it should be understood that these are given merely by way of illustration, and not of limitation, and that changes may be made in the details without departing from the spirit and the scope of the invention as hereinafter claimed.

In the drawings,

FIGS. 1 and 2 are flow sheets of two different cycling devices for the oxime rearrangement to lactams.

FIG. 3 is a schematic of a continuous mixer or blender.

FIG. 4 is a top plan view of a ring-shaped or annular nozzle for use in the blender shown in FIG. 3.

EXAMPLE 1

(Reference FIG. 1)

The liquid oxime (molten or in solution) is fed from storage vessel 1 by way of pump 2 into the reaction cycle consisting of a lactam-acid catalyst mixture and reaction product, respectively. The oxime is added directly into, or immediately before, continuous high-speed blender 3 whose exit leads into the cycle. The mixture thus obtained homogenizes instantly and traverses condenser 4 wherein the temperature of the reaction product is adjusted to its predetermined value and thence into an intermediate receptacle 5. The latter serves to impart a predetermined dwelling time to the product. The acid is stored in tank 8 and is incorporated by way of pump 9 through blender 6 whose exit opening leads into the cycle. Circulation of the cycling product is accomplished by pump 7, and the finished product is drawn off from receptacle 5, after appropriate dwelling therein, through level control 10 by means of pump 10, and is forwarded to a neutralization vessel (not shown).

EXAMPLE 2

(Reference FIG. 2)

The oxime is fed into the reaction cycle from storage vessel 1 by way of pump 2, the heat of reaction dissipated in condenser 4, and the product immediately transported to mixer 6, where the acid catalyst is added, coming from tank 8 by way of pump 9. Pump 7 circulates the reaction product. The dwelling time is controlled by introduction of the product into intermediate receptacle 5' which, in this embodiment, is outside the actual cycle. This arrangement assures that no residual oxime leaves the cycle which would detract from the quality of the lactam. The finished product leaves the system through level control 10 by way of pump 11 and is carried to the neutralization vessel (not shown).

The continuous high-speed blender is shown schematically in FIG. 3. Blender 12 is provided with a high-speed agitator 13 which is driven by a suitable motor (not shown), and with an inlet pipe 14. The latter carries at its end a wedge-shaped nozzle 15. FIG. 4 is an illustration of an annular or ring-shaped nozzle 16 which can be used in lieu of the nozzle 15 shown in FIG. 3.

The following examples illustrate the production of lactams using the equipment explained in Examples 1 and 2, respectively. Parts and percentages are by weight; the temperatures are in degrees centigrade.

EXAMPLE 3

18 kg. oleum (2% $SO_3$), 20 kg. dodecalactam and 8.5 kg. cyclododecanone (serving as solvent or melting point depressor, respectively), were fed into the rearrangement cycle. Using the device as shown in FIG. 2, 43 kg. (approximately 40 liters per hour) of a cyclododecanone oxime-cyclododecanone mixture in proportions of 70:30 were introduced by way of blender 3. The latter had a nozzle with 3 openings of 1.8 mm. diameter. Through blender 6, having a nozzle with 3 openings of 1 mm. diameter, 27 kg. oleum per hour (2% $SO_3$) were introduced. The proportions of cyclododecanenone oxime to oleum were 1:0.9, the temperature between blender 3 and condenser 4 was 103°, behind condenser 4, 101°. Pump 7 circulated 4 m.³/h. product. The level in the intermediate receptacle 5' was adjusted so that the dwelling time therein was 60–65 minutes. After that time, no cyclododecanone oxime could be found in the rearrangement product. The finished product was removed by means of the level control 10 with the aid of pump 11 and neutralized in the conventional manner with ammonia with simultaneous cycling therethrough of ammonium sulfate to facilitate the lactam precipitation. The crude dodecalactam-cyclododecanone mixture was washed and distilled. The dodecalactam thus obtained had a melting point of 154° at a yield of 95% calculated on the cyclododecanone oxime entered.

In a comparative experiment the same quantities, proportions and dwelling times were used in a conventional device, i.e., without the blenders for the introduction of oleum and lactam, but an agitated vessel of 80 liters capacity, agitator with blades rotating at a maximum of 1750 r.p.m., and conventional means for the introduction of the materials, external product circulation with condenser and a leveling vessel for carrying through the reaction. (This device is the one conventionally employed for the Beckmann rearrangement.)

The yield obtained thereby, calculated on the cyclododecanone oxime, was 88% of the theory. Refining of the rearrangement product, due to a high content of by-products, met with difficulties, and the end product, dodecalactam, had a melting point of only 152–153°.

EXAMPLE 4

The rearrangement of cyclohexanone oxime was carried out as described in the preceding example in a device corresponding to FIG. 1. The oxime added was 44 liters (water content 3.6%); oleum (26% $SO_3$) was introduced in quantities of 32 l./h.; the dwelling time was 1 hour. The excess of $SO_3$ in the rearrangement product was 5.7%. The nozzles in the oxime blender had 6 openings of 0.6 mm. diameter each. The pump circulated approximately 5 m.³/h. After neutralization, a lactam oil, free of oxime, having a cyclohexanone content of 0.4%, was obtained.

After extraction of the product thus obtained with benzene, a lactam was obtained which had thrice the permanganate value and one-half the content on volatiles, as compared with a product made in an agitator under otherwise like condtions.

EXAMPLE 5

A mixture of 16.5 kg. phosphoric acid (10% $P_2O_5$), 15 kg. dodecalactam and 10 kg. cyclododecanone, was fed into the rearrangement cycle and adjusted to a temperature of 120° in heat exchanger 4, in a device according to FIG. 2. When the temperature of 120° had been attained, 16.5 kg. phosphoric acid (containing 10% $P_2O_5$) were added per hour and 45 kg. of a mixture of 27 kg. cyclododecanone oxime and 18 kg. cyclododecanone. The proportions of oxime to phosphoric acid were 1:1.1, the reaction temperature between blender 3 and heat exchanger 4 122°, and behind 4, 118–120°. The dwelling time of the product was approximately 60 minutes. The other conditions were the same as described in Example 3.

The rearrangement product was neutralized with aqueous ammonia in the presence of a 45–50% ammonium hydrogen phosphate at a pH 5.5.

The dodecalactam-cyclododecanone mixture precipitating from the aqueous phase was washed with water while at a melt temperature of 95° and then distilled at reduced pressure. 98.5% of theory dodecalactam thus were obtained, calculated on the cyclododecanone oxime, and 96.8% of the cyclododecanone used as solvent, calculated on the starting amount.

We claim as our invention:

1. In a process for the continuous production of a lactam from a cyclic ketoxime by Beckmann rearrangement in the presence of a mineral acid, the improvement which comprises flowing a reaction product of said ketoxime and said acid through a continuous recycling flow path, introducing the ketoxime into the flowing reaction product in a plurality of schlieren, introducing the acid into the flowing reaction product in a plurality of schlieren, the introduction of the ketoxime and the introduction of the acid being at different points along the flow path, mixing separately the introduced ketoxime schlieren with the flowing reaction product and the introduced acid schlieren with the flowing reaction product to distribute them therethrough whereby the acid and the ketoxime contact each other at maximum dilution and undesirable by-product formation caused by local overheating is suppressed, said ketoxime and said acid being directly introduced beneath the surface and within the flowing reaction product.

2. The process as described in claim 1 wherein said distribution is substantially instantaneous.

3. The process as described in claim 2 wherein the ketoxime and the acid are each introduced at a speed which is at least twice the velocity of the flowing reaction product.

4. The process as described in claim 2 wherein sufficient ketoxime is introduced so that the volume proportion of the flowing reaction product to the ketoxime introduced is from 50:1 to 150:1.

5. The process as described in claim 2 wherein said ketoxime has 5 to 15 carbon atoms and said mineral acid is selected from the group consisting of sulfuric acid, oleum and phosphoric acid.

6. The process as described in claim 2 further including the step of removing reaction heat generated upon said contacting.

7. The process as described in claim 6 wherein said step of removing is carried out at a point along said flow path downstream from the point at which the ketoxime is introduced and upstream from the point at which the acid is introduced into the flow path.

8. The process as described in claim 7 further including the steps of imparting a dwell time to a mixture of introduced ketoxime, introduced acid and their reaction product after removal of reaction heat therefrom, and after completion of said dwell time drawing off a portion of the dwelled mixture.

9. The process as described in claim 8 wherein said step of imparting a dwell time is carried out at a point along said flow path downstream from the point at which said step of removing reaction heat is carried out and upstream from the point at which said step of acid introduction is carried out.

10. The process as described in claim 8 wherein said step of imparting a dwell time is carried out without the continuous recycling flow path.

References Cited

UNITED STATES PATENTS

| | | | |
|---|---|---|---|
| 2,487,246 | 11/1949 | Johnson et al. | 260—239.3 |
| 2,573,374 | 10/1951 | Wichterle | 260—239.3 |
| 3,016,375 | 1/1962 | Hopkins et al. | 260—239.3 |
| 3,152,117 | 10/1964 | Eijsberg et al. | 260—239.3 |
| 3,416,889 | 12/1968 | Caldwell | 23—156 |

FOREIGN PATENTS

| | | | |
|---|---|---|---|
| 78,624 | 8/1955 | Netherlands | 260—239.3 |
| 1,346,573 | 11/1963 | France | 260—239.3 |

HENRY R. JILES, Primary Examiner

R. T. BOND, Assistant Examiner